US008605305B2

(12) United States Patent
Yanagi

(10) Patent No.: US 8,605,305 B2
(45) Date of Patent: Dec. 10, 2013

(54) INFORMATION PROCESSING APPARATUS, IMAGE FORMING APPARATUS AND USER INTERFACE GENERATING METHOD

(75) Inventor: Hideki Yanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 405 days.

(21) Appl. No.: 13/046,347

(22) Filed: Mar. 11, 2011

(65) Prior Publication Data

US 2011/0228310 A1    Sep. 22, 2011

(30) Foreign Application Priority Data

Mar. 18, 2010    (JP) ................................ 2010-062603

(51) Int. Cl.
*G06K 15/00* (2006.01)

(52) U.S. Cl.
USPC ........ 358/1.14; 358/1.13; 358/1.15; 709/201; 709/217; 719/328

(58) Field of Classification Search
USPC ............... 358/1.13, 1.14, 1.15; 709/201, 217; 719/328
See application file for complete search history.

(56) References Cited

U.S. PATENT DOCUMENTS

| 2006/0114493 A1* | 6/2006 | Slightam et al. ............. 358/1.15 |
| 2007/0234400 A1* | 10/2007 | Yanagi ............................... 726/1 |
| 2009/0063718 A1 | 3/2009 | Sekine et al. |
| 2009/0262381 A1* | 10/2009 | Tsujimoto .................... 358/1.14 |

FOREIGN PATENT DOCUMENTS

JP    2009-059365    3/2009

* cited by examiner

*Primary Examiner* — Jacky X Zheng
(74) *Attorney, Agent, or Firm* — IPUSA, PLLC

(57) ABSTRACT

An information processing apparatus connected to an image forming apparatus includes a device information obtaining part that obtains device information from the image forming apparatus; a device information storage part that stores the obtained device information; and a UI control part that generates a user interface for selecting functions of the image forming apparatus. The device information obtaining part transmits a device information obtaining request, to which identification information is attached, to the image forming apparatus, obtains the device information including function use authority information associated with the identification information, and stores the obtained device information in the device information storage part. The UI control part carries out control of displaying selectable icons of the functions on the user interface based on the function use authority information included in the device information stored in the device information storage part.

5 Claims, 14 Drawing Sheets

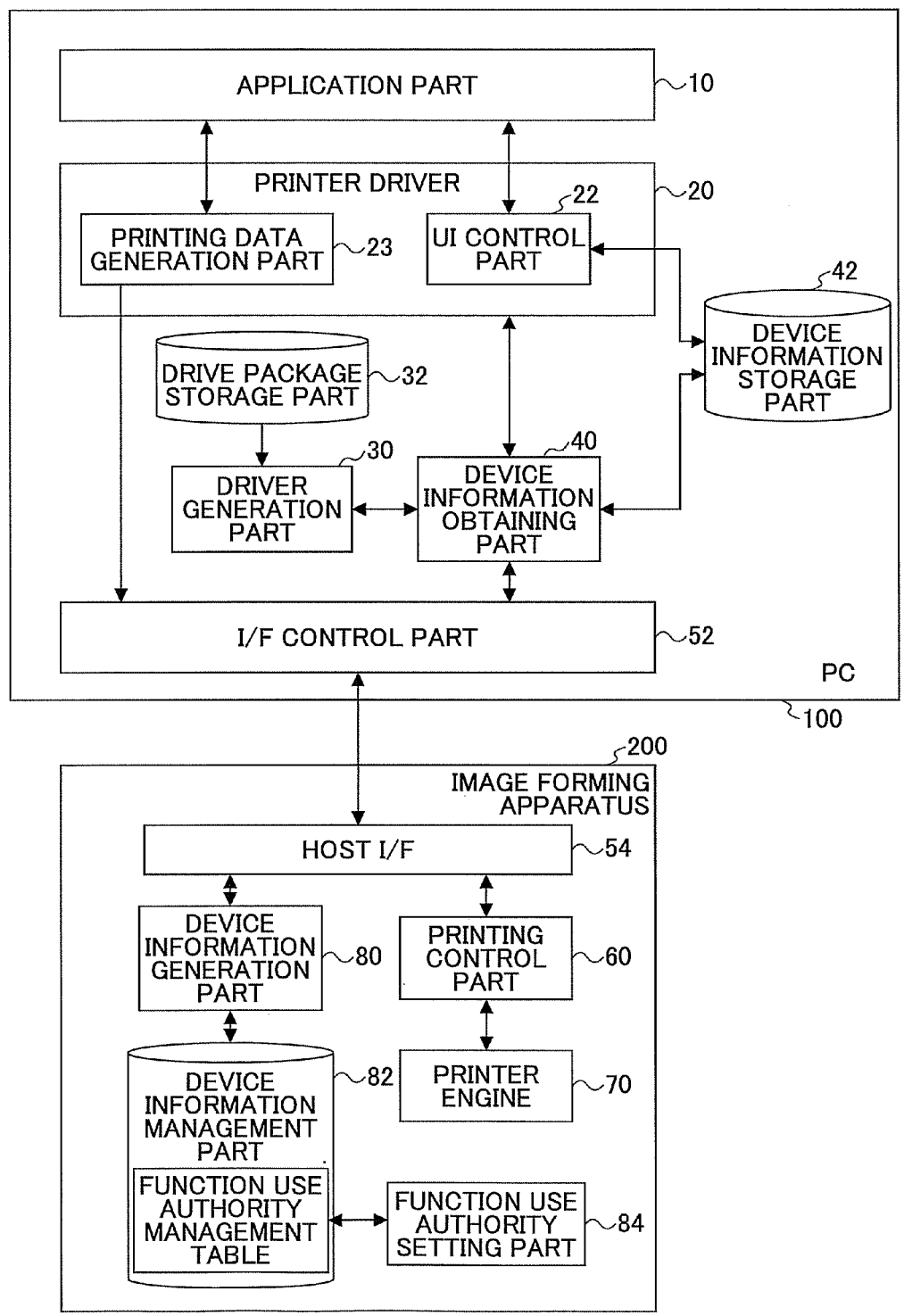

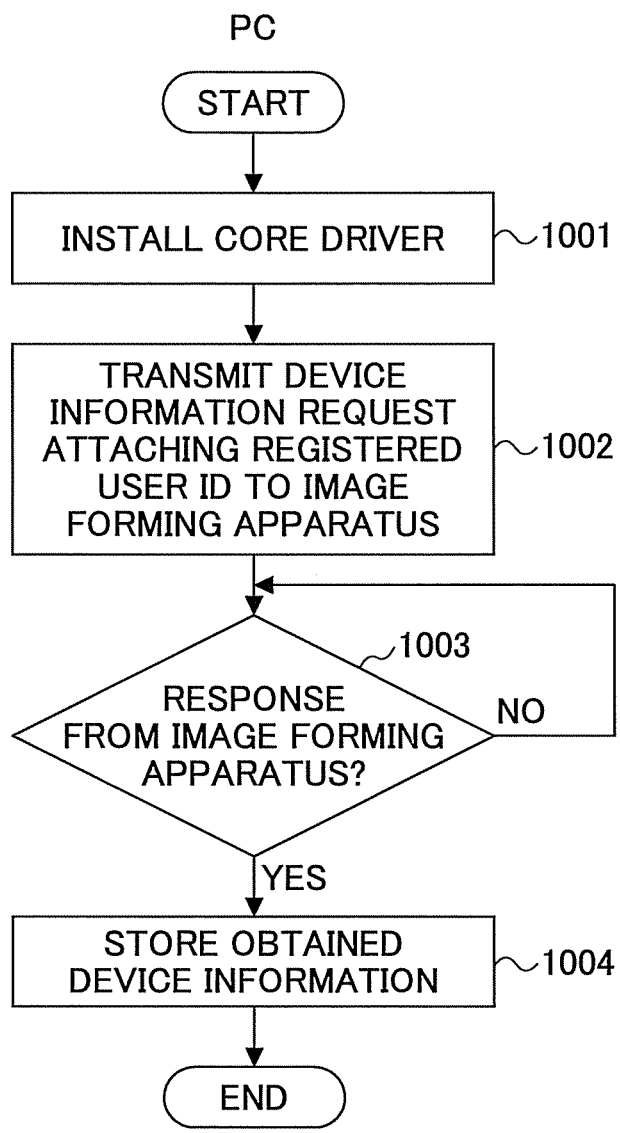

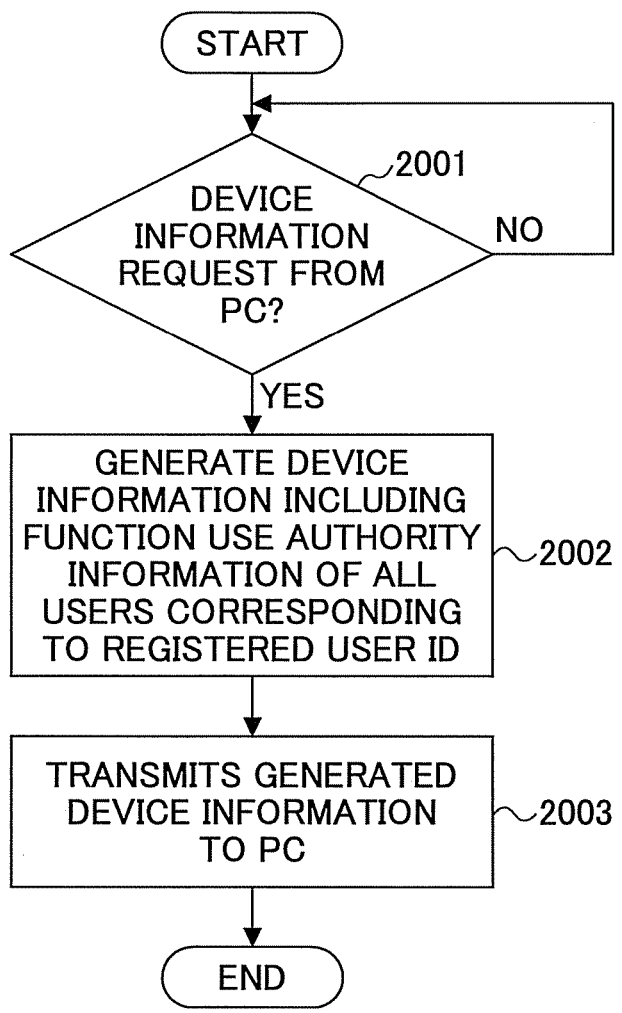

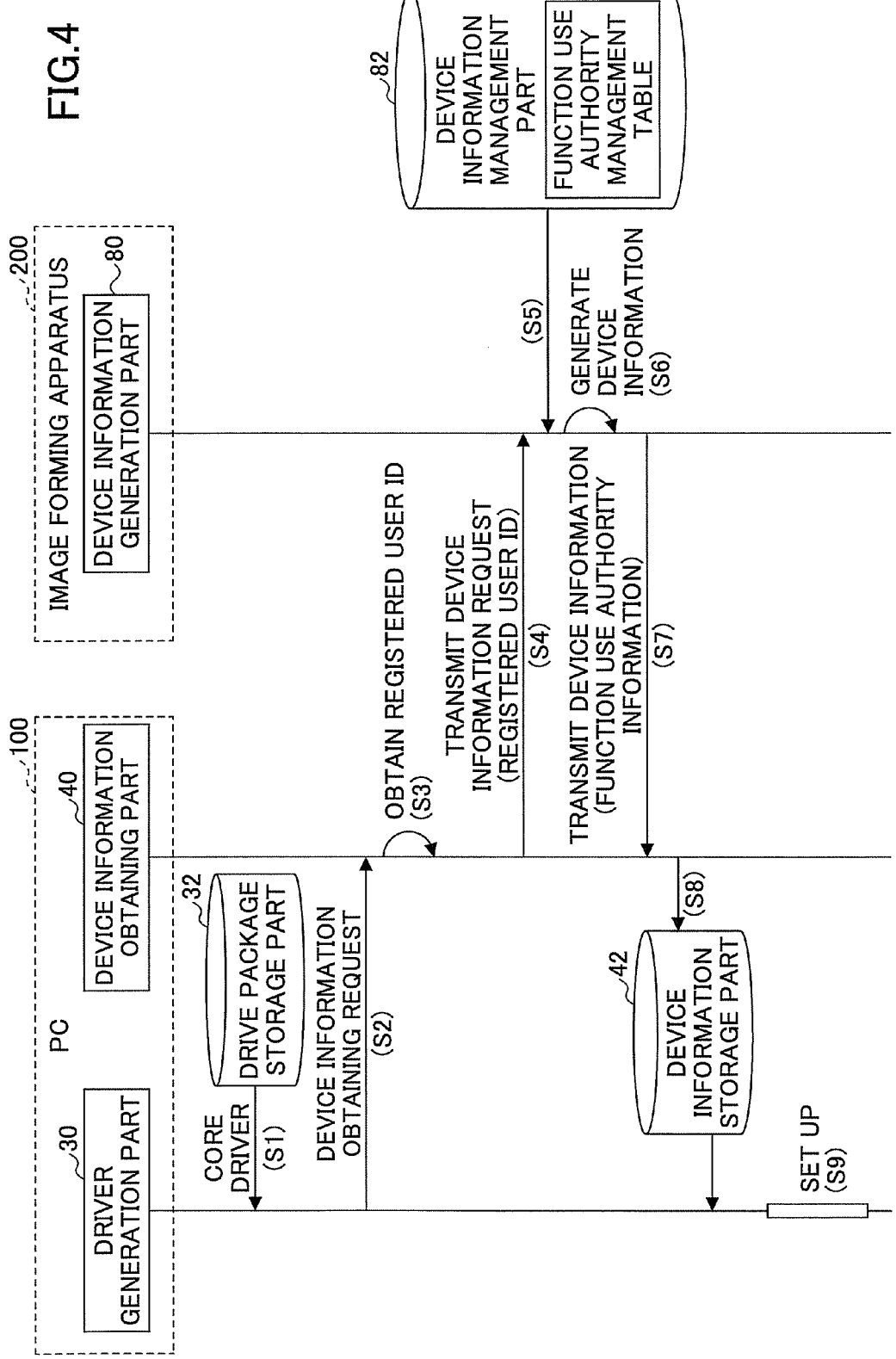

```
...
<wprt:RequestedElements>
  <wprt:Name xml:user=UserA, UserB>rodp:RicohExtensionData</wprt:Name>
</wprt:RequestedElements>
...
```

| FUNCTION | USER |
|---|---|
| PUNCH | UserB, UserD |
| STAPLE | UserC, UserE |
| BOTH SIDES | UserA, UserB, UserC |
| : | : |

```
...
<rodp:HolePunch>
    <rodp:DisplayName>Punch</rodp:DisplayName>
    <rodp:User>UserB</rodp:User>
    <rodp:AllowedValue>
        <rodp:Option>OFF</rodp:Option>
        <rodp:DisplayName>OFF</rodp:DisplayName>
    </rodp:AllowedValue>
    <rodp:AllowedValue>
        <rodp:Option>Left2</rodp:Option>
        <rodp:DisplayName>Left 2</rodp:DisplayName>
    </rodp:AllowedValue>
    <rodp:AllowedValue>
        <rodp:Option>Top2</rodp:Option>
        <rodp:DisplayName>Top 2</rodp:DisplayName>
    </rodp:AllowedValue>
    <rodp:AllowedValue>
        <rodp:Option>Right2</rodp:Option>
        <rodp:DisplayName>Right 2</rodp:DisplayName>
    </rodp:AllowedValue>
</rodp:HolePunch>

<rodp:Sides>
    <rodp:DisplayName>Print on Both Sides</rodp:DisplayName>
    <rodp:User>UserA, UserB</rodp:User>
    <rodp:AllowedValue>
        <rodp:Option>OneSided</rodp:Option>
        <rodp:DisplayName>None</rodp:DisplayName>
    </rodp:AllowedValue>
    <rodp:AllowedValue>
        <rodp:Option>TwoSidedLongEdge</rodp:Option>
        <rodp:DisplayName>Flip on long edge</rodp:DisplayName>
    </rodp:AllowedValue>
    <rodp:AllowedValue>
        <rodp:Option>TwoSidedShortEdge</rodp:Option>
        <rodp:DisplayName>Flip on short edge</rodp:DisplayName>
    </rodp:AllowedValue>
</rodp:Sides>
...
```

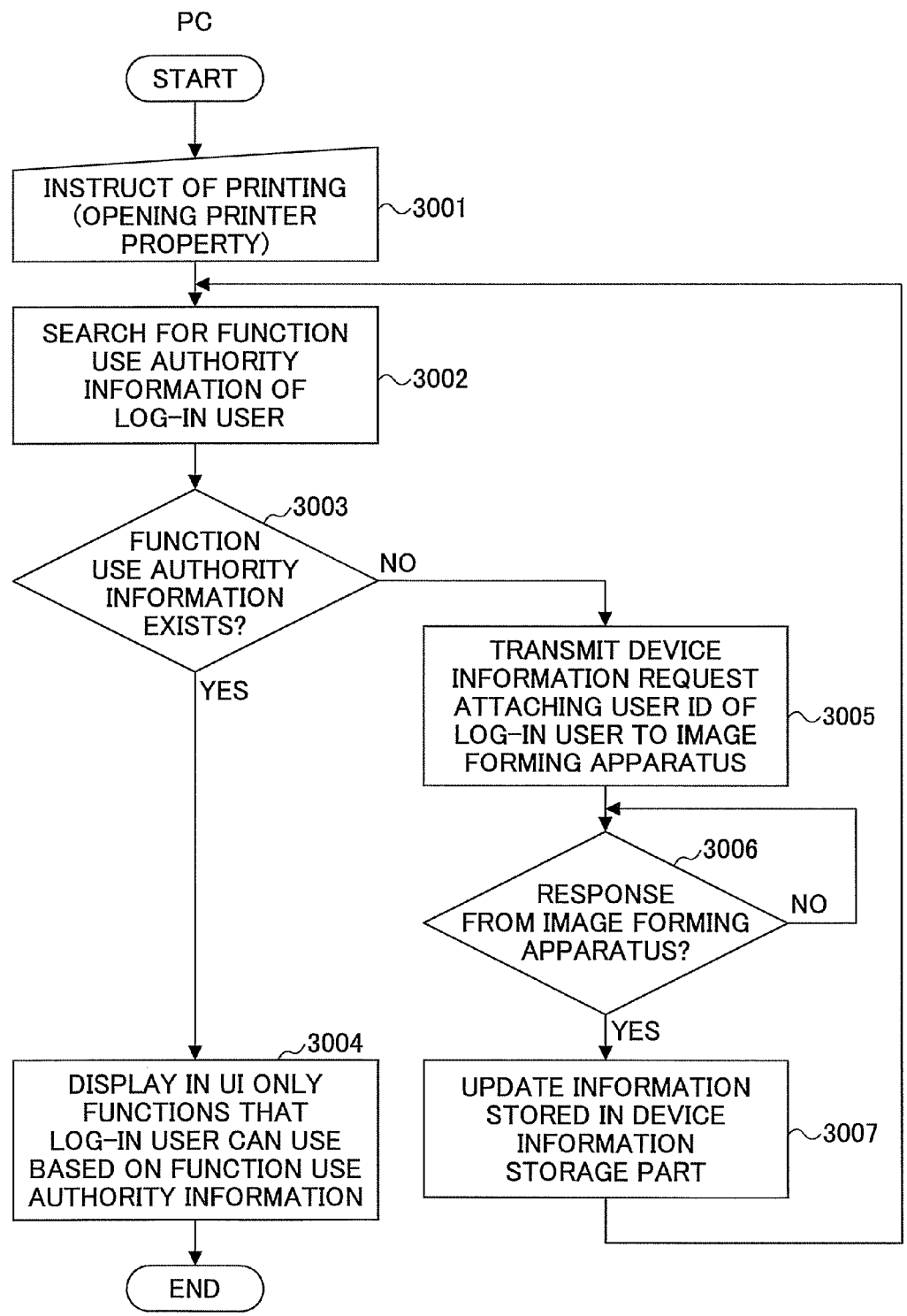

```
...
<rodp:Staple>
    <rodp:DisplayName>Staple</rodp:DisplayName>
    <rodp:User>UserC</rodp:User>
    <rodp:AllowedValue>
        <rodp:Option>OFF</rodp:Option>
        <rodp:DisplayName>OFF</rodp:DisplayName>
    </rodp:AllowedValue>
    <rodp:AllowedValue>
        <rodp:Option>Left</rodp:Option>
        <rodp:DisplayName>Left</rodp:DisplayName>
    </rodp:AllowedValue>
    <rodp:AllowedValue>
        <rodp:Option>Top</rodp:Option>
        <rodp:DisplayName>Top</rodp:DisplayName>
    </rodp:AllowedValue>
</rodp:Staple>

<rodp:Sides>
    <rodp:DisplayName>Print on Both Sides</rodp:DisplayName>
    <rodp:User>UserC</rodp:User>
    <rodp:AllowedValue>
        <rodp:Option>OneSided</rodp:Option>
        <rodp:DisplayName>None</rodp:DisplayName>
    </rodp:AllowedValue>
    <rodp:AllowedValue>
        <rodp:Option>TwoSidedLongEdge</rodp:Option>
        <rodp:DisplayName>Flip on long edge</rodp:DisplayName>
    </rodp:AllowedValue>
    <rodp:AllowedValue>
        <rodp:Option>TwoSidedShortEdge</rodp:Option>
        <rodp:DisplayName>Flip on short edge</rodp:DisplayName>
    </rodp:AllowedValue>
</rodp:Sides>
...
```

FIG.12

```
900  ...
     <rodp:HolePunch>
         <rodp:DisplayName>Punch</rodp:DisplayName>
         <rodp:User>UserB</rodp:User>
         <rodp:AllowedValue>
             <odp:Option>OFF</rodp:Option>
             <odp:DisplayName>OFF</rodp:DisplayName>
         </rodp:AllowedValue>
         <rodp:AllowedValue>
             <rodp:Option>Left2</rodp:Option>
             <rodp:DisplayName>Left 2</rodp:DisplayName>
         </rodp:AllowedValue>
         <rodp:AllowedValue>
             <odp:Option>Top2</rodp:Option>
             <rodp:DisplayName>Top 2</rodp:DisplayName>
         </rodp:AllowedValue>
         <rodp:AllowedValue>
             <odp:Option>Right2</rodp:Option>
             <odp:DisplayName>Right 2</rodp:DisplayName>
         </rodp:AllowedValue>
     </rodp:HolePunch>

<rodp:Staple>
         <rodp:DisplayName>Staple</rodp:DisplayName>
         <rodp:User>UserC</rodp:User>
         <rodp:AllowedValue>
             <odp:Option>OFF</rodp:Option>
             <rodp:DisplayName>OFF</rodp:DisplayName>
         </rodp:AllowedValue>
         <rodp:AllowedValue>
             <odp:Option>Left</rodp:Option>
             <rodp:DisplayName>Left</rodp:DisplayName>
         </rodp:AllowedValue>
         <rodp:AllowedValue>
             <odp:Option>Top</rodp:Option>
             <rodp:DisplayName>Top</rodp:DisplayName>
         </rodp:AllowedValue>
     </rodp:Staple>

<rodp:Sides>
         <rodp:DisplayName>Print on Both Sides</rodp:DisplayName>
         <rodp:User>UserA, UserB, UserC</rodp:User>
         <rodp:AllowedValue>
             <odp:Option>OneSided</rodp:Option>
             <odp:DisplayName>None</rodp:DisplayName>
         </rodp:AllowedValue>
         <rodp:AllowedValue>
             <odp:Option>TwoSidedLongEdge</rodp:Option>
             <odp:DisplayName>Flip on long edge</rodp:DisplayName>
         </rodp:AllowedValue>
         <rodp:AllowedValue>
             <odp:Option>TwoSidedShortEdge</rodp:Option>
             <odp:DisplayName>Flip on short edge</rodp:DisplayName>
         </rodp:AllowedValue>
     </rodp:Sides>
     ...
```

INFORMATION PROCESSING APPARATUS, IMAGE FORMING APPARATUS AND USER INTERFACE GENERATING METHOD

BACKGROUND OF THE INVENTION

1. Field of the Invention

The present invention relates to an information processing apparatus, and in more detail, to an information processing apparatus that can dynamically generate a user interface that displays only selectable icons for functions for which a user has use authority.

2. Description of the Related Art

Currently, a Plug and Play Extensions (PnP-X) function is normally mounted in Windows (registered trademark) Vista that is an OS (Operating System) of Microsoft (registered trademark) Co., Ltd. When a peripheral such as a printer is connected to an information processing apparatus that mounts the PnP-X function via a network with a WSD protocol, the printer notifies the information processing apparatus of this connection by transmitting a Hallo message of WS-Discovery, and transmits detailed information of the printer to the information processing apparatus. In response thereto, the information processing apparatus displays the printer in a network folder as a WSD compliant device.

When the user selects the printer displayed in the network folder, the information processing apparatus obtains, from the printer, capability information that describes the functions and performance of the printer. The information processing apparatus generates a printer driver based on the obtained capability information, and automatically installs the printer driver. At this time, a user interface such as a print property screen page is defined based on the capability information. Concerning this point, Japanese Laid-Open Patent Application No. 2009-59365 (Patent Document 1) discloses a printing system that obtains function information unique to a machine type from a printer to generate a printer driver, and automatically installs the printer driver.

However, for the above-mentioned network printing system, in a case where a different usage limitation is set for each user concerning various functions of the printer, the following problem may occur. That is, in the related art, a printer driver displays a user interface in such a manner that all the functions of a printer are selectable. Therefore, a user who does not have use authority for some functions of the printer is to endure being denied execution of a function even when the user selects the function in response to a display of icons in a printer property screen page.

SUMMARY OF THE INVENTION

According to an embodiment of the present invention, an information processing apparatus connected to an image forming apparatus includes a device information obtaining part that obtains device information from the image forming apparatus; a device information storage part that stores the obtained device information; and a UI control part that generates a user interface for selecting functions of the image forming apparatus. The device information obtaining part transmits a device information obtaining request, to which identification information is attached, to the image forming apparatus, obtains the device information including function use authority information associated with the identification information, and stores the obtained device information in the device information storage part. The UI control part controls displaying, on the user interface, selectable icons for selecting functions, based on the function use authority information included in the device information stored in the device information storage part.

Other objects, features and advantages of the present invention will become more apparent from the following detailed description when read in conjunction with the accompanying drawings.

BRIEF DESCRIPTION OF THE DRAWINGS

FIG. 2 shows a functional block diagram of the information processing apparatus and the image forming apparatus according to the embodiment;

FIGS. 3A and 3B show flowcharts of processes carried out when a printer driver is set up;

FIG. 4 shows a sequence diagram of the processes carried out when the printer driver is set up;

FIG. 5 shows a device information request;

FIG. 6 shows a function use authority management table;

FIG. 7 shows device information;

FIG. 8 shows a flowchart of a process of displaying a printer property screen page (UI);

FIG. 11 shows device information;

FIG. 12 shows updated device information;

DETAILED DESCRIPTION OF THE EMBODIMENTS

Figure 1:
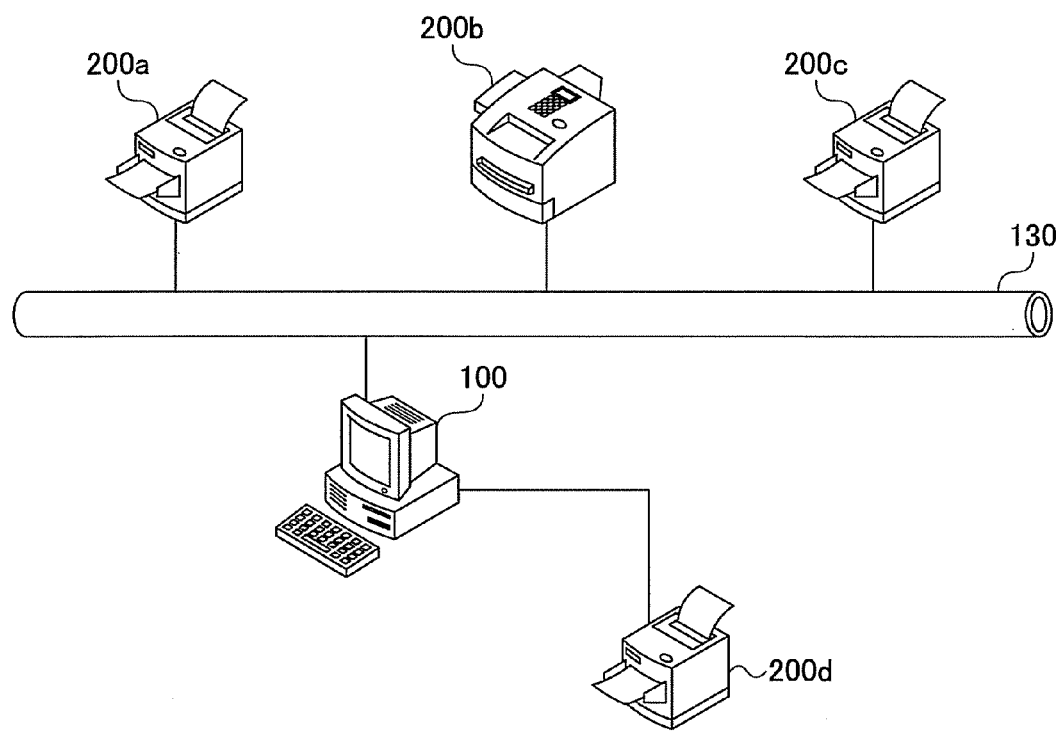
FIG. 1 shows an information processing apparatus and image forming apparatuses according to an embodiment.

An embodiment of the present invention has been devised in consideration of the above-mentioned problem in the related art, and an object of the embodiment is to provide an information processing apparatus that can dynamically generate a user interface that displays only selectable icons of functions for which a user has use authority.

According to the embodiment, the information processing apparatus transmits a device information request, to which identification information of all the users registered as accounts in the information processing apparatus is attached, to an image forming apparatus. In response thereto, the information processing apparatus obtains device information including function use authority information of all the users, and, based on the function use authority information, generates a user interface that displays only selectable icons for functions of the image forming apparatus for which a user who has logged in has use authority.

The function use authority information is information in which various functions of the image forming apparatus are associated with identification information of the users, for whom use authority has been set for the functions and who have been registered in the information processing apparatus. The UI control part can generate the user interface that displays only the selectable icons for the functions associated with the identification information of the user who has logged in.

Below, the embodiment of the present invention will be described. It is noted that the present invention is not limited to the embodiment described below. Further, in each figure which will be referred to, the same reference numerals are given to common elements, and description therefor will be appropriately omitted.

FIG. 1 shows an information processing apparatus 100 and image forming apparatuses 200a, 200b, 200c and 200d according to the embodiment. The image forming apparatuses 200a, 200b and 200c are connected to the information processing apparatus 100 via a network 130 that uses a WSD (Web Service on Device) protocol or such. The image forming apparatus 200d is locally connected with the information processing apparatus 100 via a USB cable or such. It is noted that the present invention is also applicable to an embodiment of the information processing apparatus 100 mounting a PnP (Plug and Play) function and an image forming apparatus 200d connected to the information processing apparatus 100 locally. However, below, for the sake of convenience, description will be made for a case of an example where the information processing apparatus 100 mounts the PnP-X function and the image forming apparatuses 200a, 200b and 200c are WSD compliant devices.

The information processing apparatus 100 may be configured as a host computer in a form of a personal computer, a work station, a server or another form, mounts a PENTIUM (registered trademark) processor or a compatible processor, and executes a program according to the embodiment under the control of an OS (Operating System) such as the WINDOWS (registered trademark) series, UNIX (registered trademark), LINUX (registered trademark) or MAC OS (registered trademark). Further, the information processing apparatus 100 includes a RAM providing a work space in which the program is executed, a ROM storing data to be processed or a program to be executed, an external storage device such as a hard disk drive (HDD) and various interfaces such as a network interface including NIC, and is configured to communicate with the image forming apparatuses 200a, 200b and 200c via the network 130. Further, the information processing apparatus 100 realizes various functions described later by executing application programs described in an object-oriented programming language such as C, C++, Visual C++, Visual Basic, Java (registered trademark) or such, under the control of an appropriate operating system (OS) such as the WINDOWS (registered trademark) series, UNIX (registered trademark) or LINUX (registered trademark).

The image forming apparatuses 200a, 200b, 200c and 200d may be configured as MFP (MultiFunction Peripherals) or such, and the image forming apparatuses 200a, 200b and 200c function as network printers that output (i.e., print) printing data received from the information processing apparatus 100 via the network 130. The image forming apparatuses 200a, 200b, 200c and 200d configured as MFP include processors, RAM, ROM, HDD, and so forth, and realize various functions described later by executing application programs described in an object-oriented programming language such as C, C++, Visual C++, Visual Basic, Java (registered trademark) or such, under the control of an appropriate operating system (OS) such as the WINDOWS (registered trademark) series, UNIX (registered trademark) or LINUX (registered trademark). Hereinafter, the image forming apparatuses 200a, 200b, 200c and 200d may be generally referred to as image forming apparatuses 200.

FIG. 2 shows a functional block diagram of the information processing apparatus 100 (hereinafter, simply referred to as PC 100) and the image forming apparatus 200. PC 100 includes, as shown, an application part 10, a printer driver 20, a driver generation part 30, a device information obtaining part 40 and an I/F control part 52 that acts as a data communication interface for data communication with the image forming apparatus 200.

The application part 10 includes application software for creating a document, processing an electronic spread-sheet, or such. The printer driver 20 is a functional part that receives a printing instruction from the application part 10 and generates printing data from data created by the application part 10, and includes a UI control part 22 and a printing data generation part 23. When receiving the printing instruction from the application part 10, the UI control part 22 generates a print property screen page that is a user interface (UI) presenting options of functions to the user, and displays the print property screen page on a display device (not shown) of PC 100. When the user selects a desired function from the print property screen page, the printing data generation part 23 transmits a printing instruction including printing data generated from data created by the application part 10 and information indicating the selected function to the image forming apparatus 100 via the I/F control part 52.

When the user selects the image forming apparatus 100 displayed in a network folder that is displayed on the display device for example, the driver generation part 30 sets up the above-described printer driver 20. Specifically, the driver generation part 30 installs Universal Printer Driver (hereinafter, referred to as a core driver) as a general-purpose printer driver that is mounted as a standard in an OS in the WINDOWS (registered trademark) series such as Windows (registered trademark) 2000, Windows (registered trademark) XP or Vista from a drive package storage part 32. Also, the driver generation part 30 gives an instruction for obtaining device information from the device information obtaining part 40. It is noted that the device information is attribute information (for example, device configuration information, exclusive information, function information or such) of the image forming apparatus 200 necessary to set up the printer driver 20. The driver generation part 30 describes the device information obtained from the image forming apparatus 200 in a GPD (Generic Printer Description) file that is mounted as a DLL (Dynamic Link Library) file. The driver generation part 30 reads the GPD file, customizes the core driver, and thus, sets up the printer driver 20.

The device information obtaining part 40 transfers the device information obtained from the image forming apparatus 200 to the UI control part 22, and the UI control part 22 generates the print property screen page (UI) for selectably showing the functions that the image forming apparatus 200 has, based on the device information.

The image forming apparatus 200 includes a host I/F 54 that is a data communication interface for data communication with PC 100, a printing control part 60, a printer engine 70 and a device information generation part 80.

When receiving the printing instruction from PC 100 via the host I/F 54, the printing control part 60 drives the printer engine 70 and causes the printer engine 70 to output printing data in a form of printed matter. When receiving a device information request from PC 100 via the host I/F 54, the device information generation part 80 obtains the device information corresponding to the device information request from the device information management part 82, generates a response command describing the device information in XML or such, and transmits the response command to PC 100 via the host I/F 54.

It is noted that in the embodiment, the device information that PC 100 receives from the image forming apparatus 200 includes "function use authority information". "Function use authority information" according to the embodiment is information in which various functions (a both sides printing function, a punching function, a stapling function and so forth) that the image forming apparatus 100 can carry out and users for whom use authority has been set for the functions are described in such a manner that the functions are associated with the users for whom use authority has been set for the functions. For this purpose, the device information management part 82 of the image forming apparatus 200 includes a function use authority management table for managing the users' use authority. The device information generation part 80 reads the function use authority management table, generates the device information including the function use authority information, and transmits the device information to the PC 100. It is noted that in the embodiment, the image forming apparatus 200 includes a function use authority setting part 84 for adding, deleting, changing and so forth of users' use authority.

The device information obtaining part 40 of PC 100 stores the device information obtained from the image forming apparatus 200 in the device information storage part 42. Thus, the configurations of the functional parts included in the PC 100 and the image forming apparatus 200 according to the embodiment have been described. Next, specific processes that PC 100 and the image forming apparatus 200 carry out will be described.

FIG. 3A shows a flowchart of a process carried out when PC 100 sets up the printer driver 20. For example, when the user selects the image forming apparatus 200 displayed in the network folder, a setting up process is carried out. In step S1001, a core driver that is used as a core of the printer driver 20 is installed. In step S1002, a device information request, to which identification information of the registered users is attached, is generated, and is transmitted to the image forming apparatus 200. Then, in step S1003, PC 100 waits for a response from the image forming apparatus 200 (step S1003 NO). When PC 100 receives the device information from the image forming apparatus 200 (step S1003 YES), PC 100 stores the received device information in the device information storage part 42 and sets up the printer driver 20 based on the stored device information in step S1004. Thus, the process is finished.

FIG. 3B shows a flowchart of a process of responding by the image forming apparatus 200 in the setting up process described above with reference to FIG. 3A. In step S2001, the image forming apparatus 200 waits for a device information request from PC 100 (step S2001 NO). When receiving the device information request from PC 100 (step S2001 YES), the image forming apparatus 200 generates the device information including the function use authority information for all the users corresponding to all the registered user IDs included in the device information request, and attribute information necessary for generating the printer driver 20, in step S2002. Then, in step S2003, the image forming apparatus 200 transmits the generated device information to PC 100. Thus, the process is finished.

FIG. 4 shows a sequence diagram of the process carried out by PC 100 when PC 100 sets up the printer driver 20. When PC 100 detects the image forming apparatus 200 in the network 130, the driver generation part 30 installs the core driver from the drive package storage part 32 (step S1), and sends a device information obtaining request to the device information obtaining part 40 (step S2). When receiving the device information obtaining request from the driver generation part 30, the device information obtaining part 40 obtains the identification information of all the users registered as accounts in PC 100 (step S3), generates the device information request to which the identification information of the all users is attached, and transmits the generated device information request to the image forming apparatus 200 (step S4).

FIG. 5 shows one example of the device information request 300 in a form of XML thus generated by the device information obtaining part 40. In the example shown in FIG. 5, the device information request 300 includes the identification information "UserA" and "UserB" of the users registered as accounts in PC 100.

Returning to FIG. 4, when receiving the device information request 300 shown in FIG. 5, the device information generation part 80 of the image forming apparatus 200 reads the function use authority management table of the device information management part 82 based on the user identification information ("UserA" and "UserB") included in the device information request 300 (step S5).

FIG. 6 shows one example of the function use authority management table 400 in the device information management part 82. In the function use authority management table 400, the respective functions (the punching function ("PUNCH" in FIG. 6), the stapling function ("STAPLE"), the both sides printing function ("BOTH SIDE"), and so forth) available in the image forming apparatus 200 and the identification information of the users who have use authority for the respective functions are managed, in such a manner that the respective functions are associated with the users who have the use authority for the respective functions. In this case, the device information generation part 80 extracts the function use authority information ("UserA"="BOTH SIDES", "UserB"="PUNCH"+"BOTH SIDES") associated with the user identification information (at least one of "UserA" and "UserB") from the function use authority management table 400, generates the device information including the extracted function use authority information (step S6 of FIG. 4), and transmits the generated device information to PC 100 (step S7).

It is noted that the punching function is a function of the image forming apparatus 200 to punch holes in a paper sheet on which the image forming apparatus 200 forms (i.e., prints) an image. The stapling function is a function of the image forming apparatus 200 to staple paper sheets together on which the image forming apparatus forms (i.e., prints) images, respectively. The both sides printing function is a function of the image forming apparatus 200 to form (i.e., print) images on both sides of a paper sheet.

It is noted that as shown in FIG. 6, each of the users having the user identification information "UserB" and "UserD" has the function use authority for the punching function "PUNCH". Each of the users having the user identification information "UserC" and "UserE" has the function use authority for the stapling function "STAPLE". Each of the users having the user identification information "UserA", "UserB" and "UserC" has the function use authority for the both sides printing function "BOTH SIDES". Therefore, the device information generation part 80 extracts the function use authority information ("UserA"="BOTH SIDES", "UserB"="PUNCH"+"BOTH SIDES") associated with the user identification information (at least one of "UserA" and "UserB"), as mentioned above.

FIG. 7 shows one example of the thus-generated device information 700 in a form of XML. The device information 700 describes that the image forming apparatus 200 has the punching function ("HolePunch" in FIG. 7) and the both sides printing function ("Sides" in FIG. 7), the use authority for the punching function is set to the user "UserB", and the use authority for the both sides printing function is set to both the users "UserA" and "UserB".

Returning to FIG. 4, when PC 100 receives the device information from the image forming apparatus 200, the device information obtaining part 40 of PC 100 stores the received device information in the device information storage part 42 (step S8). The driver generation part 30 of PC 100 customizes the core driver based on the stored device information, and sets up the printer driver 20 adapted for the image forming apparatus 200, in step S9. Thus, the sequence of the processes carried out when the printer driver 20 is set up has been described. Next, a process of displaying the printer property screen page (UI) in PC 100 according to the embodiment will be described.

FIG. 8 shows a flowchart of a process of displaying the printer property screen page (UI). When the user gives an instruction for printing a desired data file in step S3001, the identification information of the user who has currently logged in is obtained in step S3002, and the device information stored in the device information storage part 42 is read based on the obtained identification information. As a result, when the function use authority information associated with the user having logged in exists in the thus-read device information (step S3003 YES), the printer property screen page (UI) that displays only selectable icons for the functions for which the user having logged in has the use authority is generated in step S3004 based on the contents of the existing function use authority information, and the generated printer property screen page is displayed on the display device.

Figure 9A:
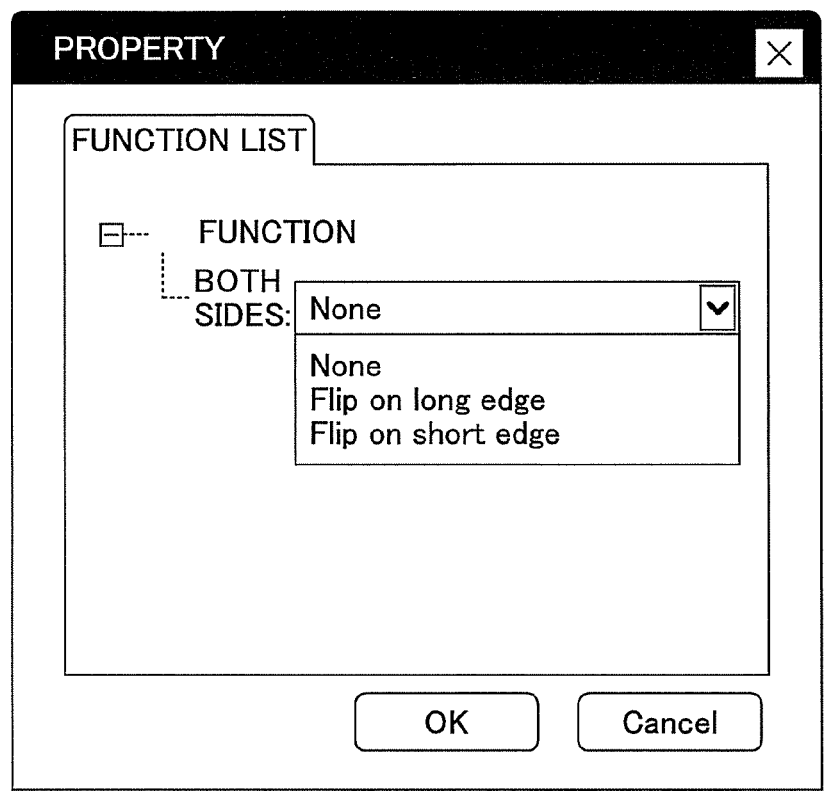
FIGS. 9A and 9B show the printer property screen pages (UI)

It is noted that assuming that the user having logged in is the user "UserA", the device information 700 shown in FIG. 7 is read based on the identification information "UserA". As a result, as it can be seen, the function for which the user "UserA" has the use authority is only the both sides printing function ("Sides" in FIG. 7). Therefore, on the display device of PC 100, the printer property screen page (UI) shown in FIG. 9A is displayed, for example. As shown in FIG. 9A, in the function list "FUNCTION LIST", only the both sides printing function "BOTH SIDES" is displayed.

Figure 9B:
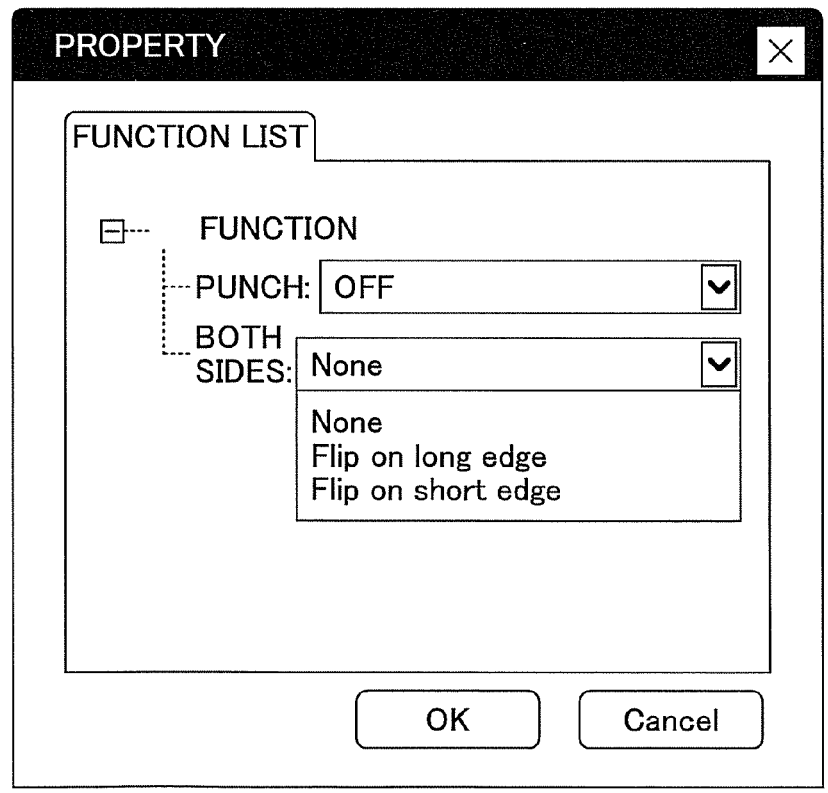

On the other hand, assuming that the user having logged in is the user "UserB", the device information 700 shown in FIG. 7 is read based on the identification "UserB". As a result, as it can be seen, the functions for which the user "UserB" has the use authority are the two functions, i.e., the punching function ("HolePunch") and the both sides printing function ("Sides"). Therefore, on the display device of PC 100, the printer property screen page (UI) shown in FIG. 9B is displayed, for example. As shown in FIG. 9S, in the function list "FUNCTION LIST", in this case, the punching function "PUNCH" and the both sides printing function "BOTH SIDES" are displayed.

Thus according to the embodiment, displaying the icons for selecting the functions in the printer property screen page is customized depending on the use authority that the user having logged in has. As a result, the user can become free from such a stressful procedure that execution of the function is repeatedly denied even when the user actually selects the function in response to the icons displayed on the printer property screen page.

Next, again with reference to the flowchart of FIG. 8, a process of displaying the printer property screen page (UI) in a case where a new user (having the identification information of "UserC") is registered as an account in PC 100 after the printer driver 20 is set up in PC 100 and the new user gives a printing instruction from PC 100.

When the user gives an instruction for printing a desired data file to PC 100 in step S3001, the identification information "UserC" of the user currently having logged in is obtained in step S3002, and the device information stored in the device information storage part 42 is read based on the obtained identification information. It is noted that when the device information 700 shown in FIG. 7 is read, no function use authority information exists for the user identification information "UserC" in the device information 700 (step S3003 NO). Then, a device information request to which the identification information "UserC" of the user having logged in is attached is generated, and the generated device information request is transmitted to the image forming apparatus 200 in step S3005. It is noted that the process carried out by the image forming apparatus 200 after waiting for the device information request is the same as that described above with reference to FIG. 3B, and thus, duplicate description will be omitted.

Then, PC 100 waits for a response to the device information request from the image forming apparatus 200 (step S3006 NO), and when PC 100 receives the response (i.e., the device information) from the image forming apparatus 200 (step S3006 YES), PC 100 updates the device information stored in the device information storage part 42 by using the function use authority information included in the received device information in step S3007, and returns to step S3002.

Figure 10:
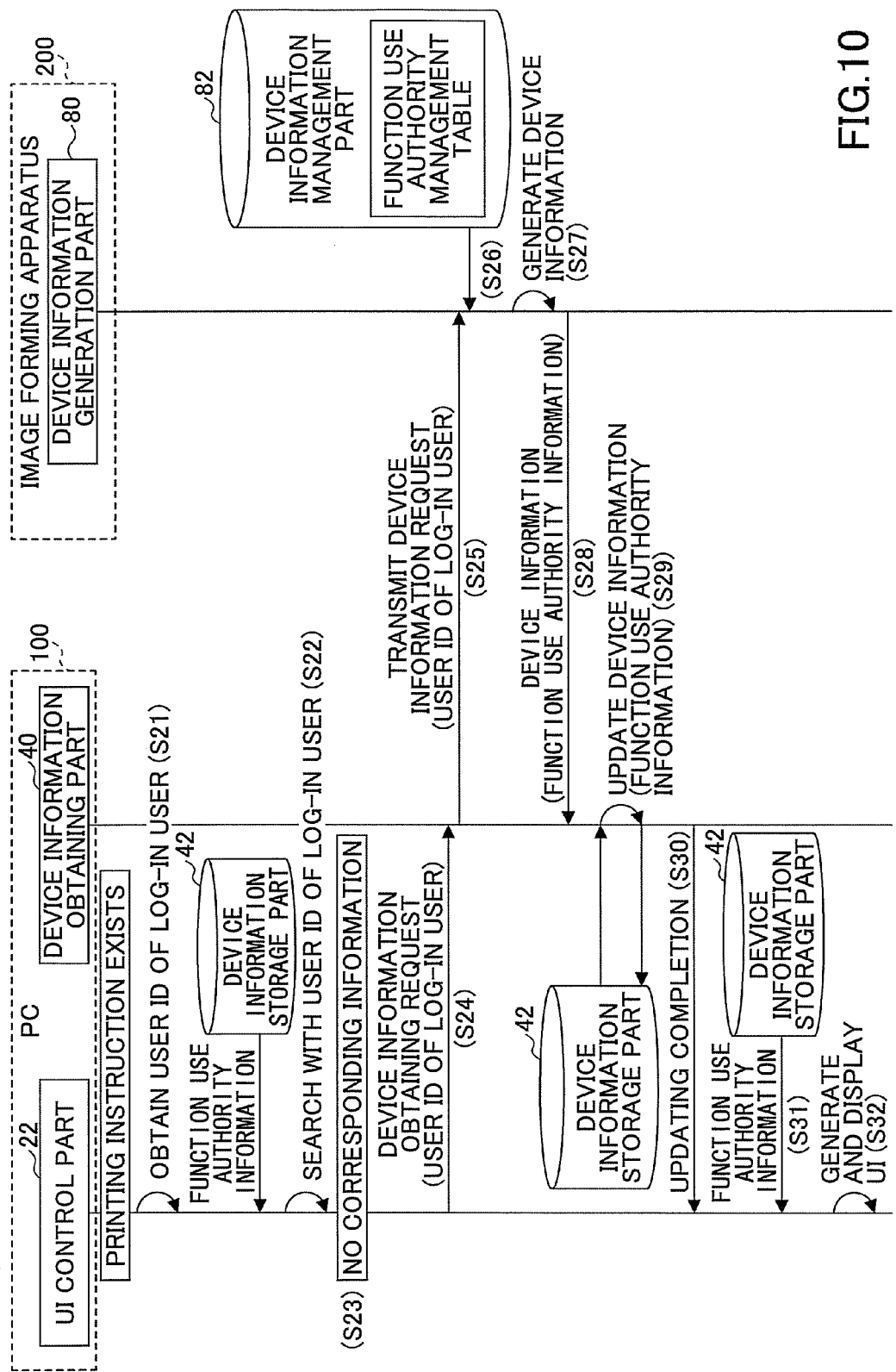
FIG. 10 shows a sequence diagram of a process carried out in a case where a printing instruction is given by a new user.

FIG. 10 shows a sequence diagram of the process carried out by PC 100 and the image forming apparatus 200 in the case where the new user (having the identification information of "UserC") is registered as the account in PC 100 after the printer driver 20 is set up in PC 100 and the new user gives the printing instruction from PC 100.

When PC 100 receives the printing instruction from the user, the UI control part 22 obtains the identifying information "UserC" of the user having logged in (step S21), and reads the device information 700 stored in the device information storage part 42 based on the obtained identification information (step S22). The UI control part 22 detects that no function use authority information associated with the user identification information "UserC" exists in the device information 700 (step S23). Then, the UI control part 22 sends a device information obtaining request to the device information obtaining part 42 (step S24). When receiving the device information obtaining request from the UI control part 22, the device information obtaining part 42 generates the device information request to which the identification information "UserC" of the user having logged in is attached, and transmits the generated device information request to the image forming apparatus 200 (step S25).

When the image forming apparatus 200 receives the device information request to which the user identification information "UserC" is attached from PC 100, the device information generation part 80 of the image forming apparatus 200 reads the function use authority management table 400 shown in FIG. 6 of the device information management part 82 based on the user identifying information "UserC" included in the received device information request (step S26). In this case, since the user "UserC" has the use authority for the stapling function "STAPLE" and the both sides printing function "BOTH SIDES" as shown in FIG. 6, the device information generation part 80 extracts these two functions associated with the user identification information "UserC", generates the device information including the function use authority information of "UserC" based on the extracted functions (step S27), and transmits the generated device information to PC 100 (step S28).

FIG. 11 shows an example of the thus-generated device information 800 in a form of XML. The device information 800 describes that the image forming apparatus 200 has the stapling function ("Staple") and the both sides printing function ("Sides"), and the use authority is set to the user "UserC" for the stapling function and the both sides printing function.

When PC 100 receiving the device information 800 from the image forming apparatus 200, the device information obtaining part 40 uses the received device information, and updates the device information stored in the device information storage part 42 (step S29). According to the embodiment, the updating can be achieved by merging the device information 700 already stored in the device information storage part 42 and the device information 800 newly received from the image forming apparatus 200.

FIG. 12 shows an example of the thus-updated device information 900. As shown in FIG. 12, the device information 900 describes that the image forming apparatus 200 has the punching function ("HolePunch"), the stapling function ("Staple") and the both sides printing function ("Sides"), and the use authority is set only to the user "UserB" for the punching function, the use authority is set only to the user "UserC" for the stapling function, and the use authority is set to each of all the users "UserA", "UserB" and "UserC" for the both sides printing function.

That is, as a result of the merging, as shown in FIGS. 7, 11 and 12, the information concerning the use authority for the punching function "HolePunch" included in the device information 700 and the information concerning the stapling function "Staple" included in the device information 800 are maintained as they are in the device information 900. On other hand, since the information concerning the use authority for the both sides printing function "Sides" is included in both the device information 700 and, the device information 800, the information concerning the use authority for the both sides printing function "Sides" are actually merged in the device information 900. That is, for the both sides printing function "Sides", the user identification information "UserA" and "UserB" included in the device information 700 and the user identification information "UserC" included in the device information 800 are merged together in the user identification information "UserA", "UserB" and "UserC" included in the device information 900, as shown.

Figure 13:
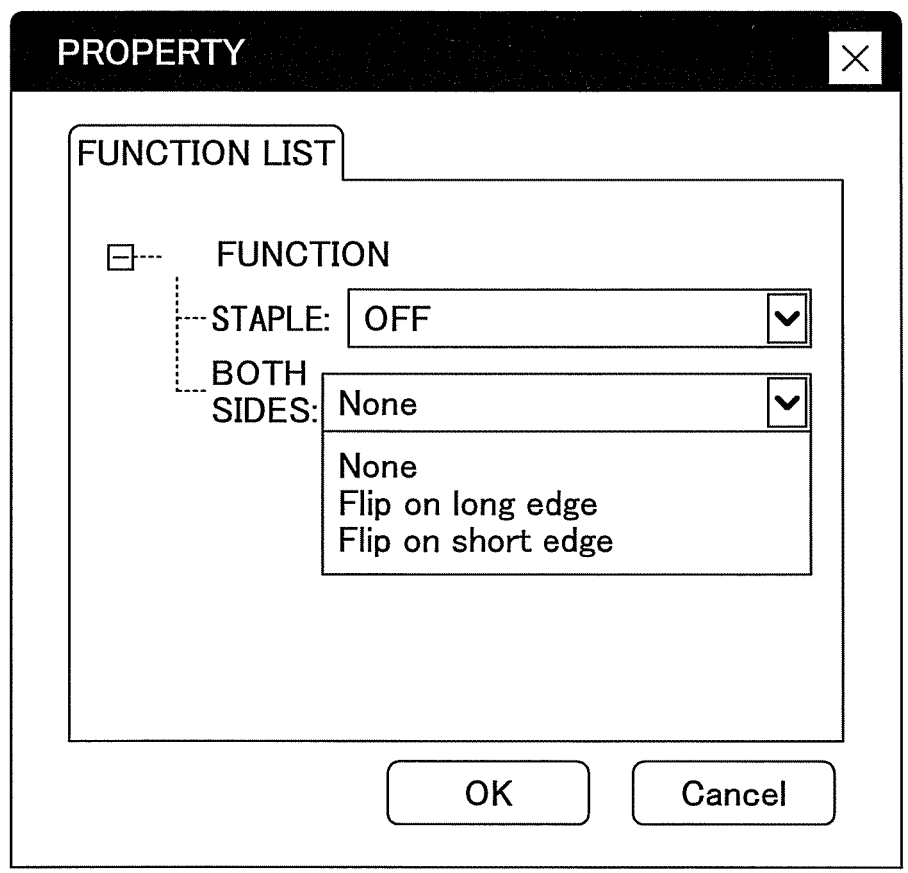
FIG. 13 shows the printer property screen page (UI)

When the updating of the device information is thus completed, the device information obtaining part 40 notifies the UI control part 22 of this completion (step S30). The UI control part 22 having received the updating completion notification again reads the updated device information 900 based on the user identification information "UserC" of the user having logged in (step S31). In this case, since the functions for which the user of the identification information "UserC" has the use authority are the stapling function ("Staple") and the both sides printing function ("Sides") as shown in FIG. 12, the printer property screen page (UI) shown in FIG. 13 for example is displayed on the display device of PC 100 (step S32). As shown in FIG. 13, in the function list "FUNCTION LIST", the stapling function "STAPLE" and the both sides printing function "BOTH SIDES" are displayed.

Thus, according to the embodiment, even in the case where the new user is registered as the account after the printer driver has been set up and the printing instruction is given by the new user, the suitable printer property screen page (UI) is displayed depending on the use authority of the new user.

It is noted that in the above-described embodiment, in the case where the new user is registered as the account after the printer driver has been set up and the printing instruction is given by the new user, the device information including the function use authority information corresponding to only the new user is obtained from the image forming apparatus 200, and the thus-obtained device information is merged with the device information already stored in the device information storage part 42. However, a method of updating the device information is not limited to this method. For example, as a variant embodiment, such a method of updating the device information may be used for the same case that the device information including the function use authority information corresponding to all the users including the new user is newly obtained from the image forming apparatus 200, and the thus-obtained device information is used to replace the device information already stored in the device information storage part 42.

Figure 14:
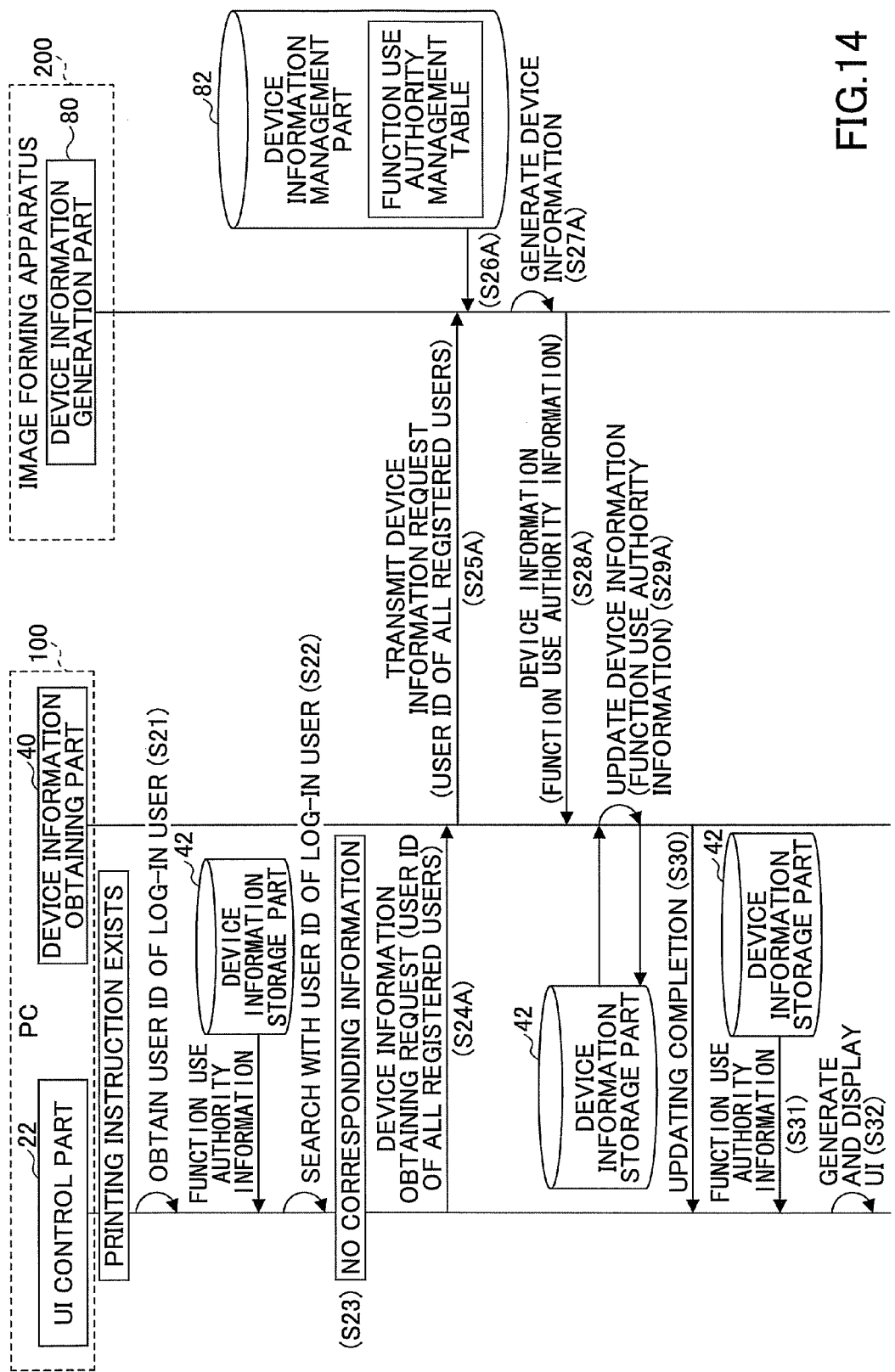
FIG. 14 shows a sequence diagram of another example of a process carried out in the case where the printing instruction is given by the new user.

The above-mentioned variant embodiment will now be described. FIG. 14 shows a sequence diagram of another process carried out by PC 100 and the image forming apparatus 200 in the case where the new user (having the identification information of "UserC") is registered as the account in PC 100 after the printer driver 20 is set up in PC 100 and the new user gives the printing instruction from PC 100, according to the variant embodiment. FIG. 14 is almost the same as FIG. 10, and the same reference numerals (step numbers) are given to the identical steps, and the duplicate description therefor will be omitted.

In FIG. 14, the UI control part 22 sends a device information obtaining request to the device information obtaining part 42 (step S24A). When receiving the device information obtaining request from the UI control part 22, the device information obtaining part 42 generates the device information request to which the identification information of all the users currently registered as the accounts in PC 100 including the identification information "UserC" of the user having logged in is attached, and transmits the generated device information request to the image forming apparatus 200 (step S25A).

When the image forming apparatus 200 receives the device information request to which the user identification information of all the currently registered users is attached from PC 100, the device information generation part 80 of the image forming apparatus 200 reads the function use authority management table 400 shown in FIG. 6 of the device information management part 82 based on the user identifying information of all the currently registered users included in the received device information request (step S26A). In this case, the device information generation part 80 extracts all the functions associated with the user identification information of all the registered users "UserA, "UserB and "UserC", generates the device information including the function use authority information of "UserA, "UserB and "UserC" based on the extracted functions (step S27A), and transmits the generated device information to PC 100 (step S28A). FIG. 12 shows the thus-generated-and-transmitted device information 900.

When PC 100 receives the device information 900 from the image forming apparatus 200, the device information obtaining part 40 uses the received device information, and updates the device information stored in the device information storage part 42 (step S29A) by replacing the device information 700 already stored in the device information storage part 42 with the device information 900 newly received from the image forming apparatus 200.

The respective functions of the embodiments described above may be realized by using an apparatus executable program described in a legacy programming language, an object-oriented programming language or such, such as an assembly language, C, Visual C, C++, Visual C++, Java (registered trademark), Java (registered trademark) Beans, Java (registered trademark) Applet, Java (registered trademark) Script, Perl, Ruby or such, and may be distributed in a form of having been stored in an apparatus readable information recording medium.

The present invention is not limited to the specifically disclosed embodiments, and variations and modifications may be made without departing from the scope of the present invention that includes a scope of embodiments that the person skilled in the art can elaborate as long as the functions and the advantageous effects of the present invention can be obtained.

The present application is based on Japanese priority application No. 2010-062603 filed on Mar. 18, 2010, the entire contents of which are hereby incorporated herein by reference.

What is claimed is:

1. An information processing apparatus connected to an image forming apparatus comprising:
   a storage part that preliminary stores device information including function use authority information indicating users who are authorized to use a function of the image forming apparatus;
   a determination part that determines, based on identification information of a user that is logged in the image processing apparatus, whether the user as indicated by the identification information is included in the users indicated by the function use authority information included in the device information that is preliminary stored in the storage part;
   a display part that displays functions that are available to the user indicated by the identification information based on the function use authority information included in the device information that is preliminary stored in the storage part when the determination part determines that the user is included in the users indicated by the function use authority information;
   an acquisition part that acquires the device information from the image forming apparatus when the determination part determines that the user is not included in the users indicated by the function use authority information; and
   an updating part that updates the function use authority information included in the device information that is preliminary stored in the storage part based on the function use authority information included in the device information that is acquired by the acquisition part,
   wherein the display part displays functions that are available to the user indicated by the identification information according to the function use authority information that is updated by the updating part.

2. The information processing apparatus as claimed in claim 1, wherein
   the acquisition part updates the device information by merging new device information with the device information stored in the storage part.

3. The information processing apparatus as claimed in claim 1, wherein
   the acquisition part transmits the device information obtaining request to which the identification information of all registered users that are registered in the information processing apparatus is attached, obtains new device information including the function use authority information of the all registered users, and updates the device information by replacing the device information already stored in the storage part with the new device information.

4. A method for generating a user interface provided by an information processing apparatus connected to an image forming apparatus, for selecting functions of the image forming apparatus, comprising:
   preliminary storing, by the information processing apparatus, device information including function use authority information indicating users who are authorized to use a function of the image forming apparatus;
   determining, by the information processing apparatus, based on identification information of a user that is logged in the image processing apparatus, whether the user as indicated by the identification information is included in the users indicated by the function use authority information included in the device information that is preliminary stored by the preliminary storing step;
   displaying, by the information processing apparatus, functions that are available to the user indicated by the identification information based on the function use authority information included in the device information that is preliminary stored by the preliminary storing step when the determining step determines that the user is included in the users indicated by the function use authority information;
   acquiring, by the information processing apparatus, the device information from the image forming apparatus when the determining step determines that the user is not included in the users indicated by the function use authority information; and
   updating, by the information processing apparatus, the function use authority information included in the device information that is preliminary stored by the storing step based on the function use authority information included in the device information that is acquired by the acquiring step,
   wherein the displaying step displays functions that are available to the user indicated by the identification information according to the function use authority information that is updated by the updating part.

5. A system comprising:
   an information processing apparatus; and
   an image forming apparatus connected with the information processing apparatus,
   wherein said information processing apparatus comprises:
      a storage part that preliminary stores device information including function use authority information indicating users who are authorized to use a function of the image forming apparatus;
      a determination part that determines, based on identification information of a user that is logged in the image processing apparatus, whether the user as indicated by the identification information is included in the users indicated by the function use authority information included in the device information that is preliminary stored in the storage part;
      a display part that displays functions that are available to the user indicated by the identification information based on the function use authority information included in the device information that is preliminary stored in the storage part when the determination part determines that the user is included in the users indicated by the function use authority information;
      an acquisition part that acquires the device information from the image forming apparatus when the determination part determines that the user is not included in the users indicated by the function use authority information; and an updating part that updates the function use authority information included in the device information that is preliminary stored in the storage part based on the function use authority information included in the device information that is acquired by the acquisition part, wherein the display part displays functions that are available to the user indicated by the identification information according to the function use authority information that is updated by the updating part, and wherein the image forming apparatus comprises:

a device information generation part that generates device information in response to a device information obtaining request received from the information processing apparatus to which identification information is attached, and transmits the device information to the information processing apparatus; and a device information management part that manages use authority for respective functions of the image forming apparatus and the device information of the image forming apparatus, wherein the device information generation part generates the device information including the function use authority information corresponding to the identification information.

* * * * *